(12) United States Patent
Bish et al.

(10) Patent No.: US 6,467,024 B1
(45) Date of Patent: Oct. 15, 2002

(54) ACCESSING DATA VOLUMES FROM DATA STORAGE LIBRARIES IN A REDUNDANT COPY SYNCHRONIZATION TOKEN TRACKING SYSTEM

(75) Inventors: Thomas William Bish, Tucson; Gregory Tad Kishi, Oro Valley, both of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/391,186

(22) Filed: Sep. 7, 1999

(51) Int. Cl.[7] ............................................. G06F 12/00
(52) U.S. Cl. ...................... 711/114; 711/113; 711/144; 711/161; 711/162
(58) Field of Search ..................... 711/111, 112, 113, 711/114, 144, 154, 161, 162, 165

(56) References Cited

U.S. PATENT DOCUMENTS

| | | | |
|---|---|---|---|
| 4,638,424 A | | 1/1987 | Beglin et al. |
| 5,410,697 A | | 4/1995 | Baird et al. |
| 5,435,004 A | * | 7/1995 | Cox et al. ................... 707/205 |
| 5,475,834 A | | 12/1995 | Anglin et al. |
| 5,546,557 A | | 8/1996 | Allen et al. |
| 5,809,543 A | * | 9/1998 | Ryers et al. ................. 711/162 |
| 6,249,849 B1 | * | 6/2001 | Day et al. .................... 707/201 |

* cited by examiner

Primary Examiner—Matthew Kim
Assistant Examiner—Christian P. Chace
(74) Attorney, Agent, or Firm—John H. Holcombe

(57) ABSTRACT

Disclosed are a data storage library subsystem, and a method which may be implemented by a computer program product, for increasing the accessing performance of data volumes from libraries in a redundant copy synchronization token tracking system. The libraries store redundant copies of the data volumes, and have cache storage and backing storage. Updatable synchronization tokens indicate the relative update levels of the redundant copies. Each library maintains the synchronization token directly associated with each data volume; identifies each of the data volumes upon being stored in the cache storage of the library; and identifies each of the data volumes migrated to and stored in the backing storage of the library. Then, the library responds to a recall request for one of the redundant copies, providing, with the synchronization token, an indicator whether the data volume is identified as stored in the cache storage or the backing storage. The performance of the accessing is increased by a selection of a redundant copy of the data volume identified as stored in the cache storage rather than a copy identified as stored in the backing storage.

19 Claims, 6 Drawing Sheets

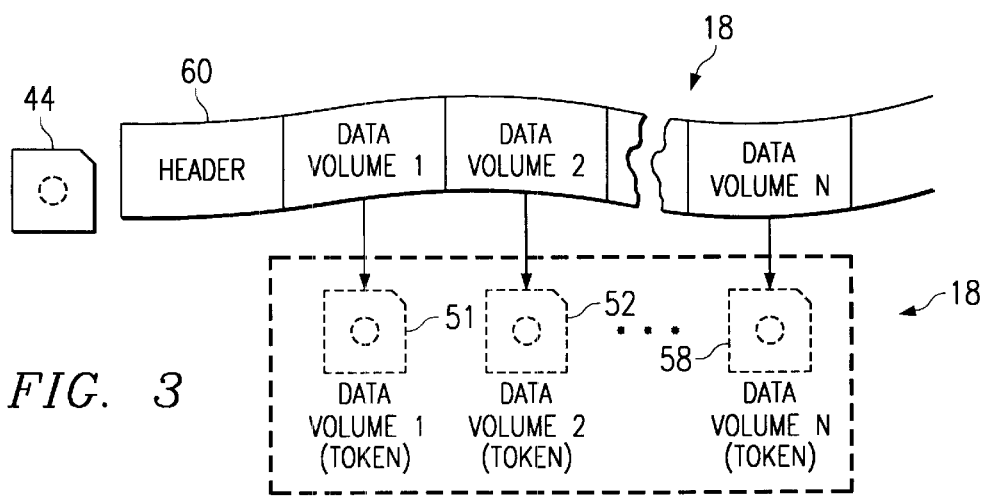
FIG. 3
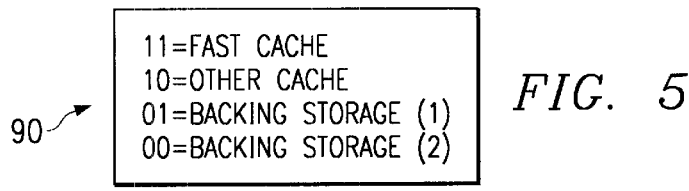
FIG. 5
FIG. 4A
FIG. 4B
FIG. 6A
FIG. 6B

ACCESSING DATA VOLUMES FROM DATA STORAGE LIBRARIES IN A REDUNDANT COPY SYNCHRONIZATION TOKEN TRACKING SYSTEM

DOCUMENTS INCORPORATED BY REFERENCE

Commonly assigned U.S. patent application Ser. No. 09/283,223 K. F. Day et al. is incorporated for its showing of a data storage library system having directors for storing and tracking multiple copies of data in system data storage libraries.

FIELD OF THE INVENTION

This invention relates to storage of redundant data in a plurality of data storage libraries, the data storage libraries having both cache storage and backing storage, and, more particularly, to accessing data volumes from the data storage libraries.

BACKGROUND OF THE INVENTION

Data processing systems comprising at least one host typically require a large amount of data storage. If the data, typically stored as a data volume, is not immediately required by the hosts, for example, if the data volume is infrequently accessed, the storage of the data volume may be on removable rewritable data storage media, such as magnetic tape or optical disk, and the data volumes may be written and or read by means of a data storage drive.

The data storage drive is typically coupled to the host, or processing unit, by means of a peripheral interface in which commands are directed only from the processing unit to the data storage drive, and the data storage drive responds to those commands, performing the commanded functions. No commands can be sent by the data storage drive to the coupled processing unit. Typically, the commands are performed by a device controller.

If a large amount of data is to be stored and accessed on occasion, data storage libraries are employed. Such data storage libraries typically provide efficient access to large quantities of data volumes stored in a backing storage of removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise the same processor as the robot controller, typically tracks each data volume and the removable data storage media on which it is stored, and tracks the storage shelf location of each data storage media. Herein, a library manager, either with or without the robot controller, is defined as a "controller" or a "library controller" for the data storage library, as is the "controller" for a data storage device as discussed above.

If the data storage media, subsequent to being accessed, is likely to be reaccessed, it is advantageous to employ data storage libraries having both cache storage and backing storage. The data storage library will access the data volume of the removable media from the backing storage and will temporarily store the data volume in the cache storage so that it can be immediately reaccessed. The removable media may then be returned to a storage shelf, and the data volume updated while it is in cache storage without the need to reaccess the removable media. The cache storage is typically limited in capacity, requiring that the data volumes be migrated to backing storage so as to free space in the cache storage. Typically, a least recently used (LRU) algorithm is employed to migrate data volumes out of cache storage to backing storage.

It is also desirable to provide a level of redundancy of the data to provide constant access to data volumes, in the event a data storage library or a communication path to a data storage library becomes unavailable.

An example of a data storage library system for redundantly storing and accessing data volumes stored on removable data storage media in a plurality of data storage libraries is described in the incorporated coassigned K. F. Day III et al application. The library controller of each library provides an updatable synchronization token directly associated with each data volume. A plurality of directors are provided, each separate from and coupled to the hosts and each separate from and coupled to each data storage library. Each director responds to separate, partitioned data storage drive addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. In most data processing applications, it is critical to access the most current data. Hence, the currency of the data volumes are each tracked by means of the directly associated synchronization token, and the synchronization token is tracked by the directors.

The time to access a data volume in the cache storage may be faster than the time to access a data volume in the backing storage by an order of magnitude. This is because access to data volumes in cache storage is accomplished at electronic or hard drive speeds, while the robot must fetch the data storage media containing the data volume from its storage shelf, and move the data storage media to a data storage drive, then the data storage media is loaded in the drive and the drive locates the requested data volume. It is thus advantageous to access data volumes in cache storage, a "cache hit" rather than to have to wait for the extra time to access data volumes in the backing storage, a "cache miss".

In the incorporated coassigned K. F. Day III et al application, the director responds to a recall request for an identifiable data volume by requesting all of the synchronization tokens from the coupled data storage libraries pertaining to that data volume. The director employes the synchronization token to determine a currently updated synchronization token for the identifiable data volume, and accesses the identifiable data volume at the data storage library having a currently updated synchronization token.

If the currently updated synchronization token is directly associated with a copy of the data volume in backing storage, a "cache miss", the data volume will be accessed at a slow rate as compared to accessing the data volume with a "cache hit".

SUMMARY OF THE INVENTION

An object of the present invention is to increase the accessing performance of data volumes from data storage libraries in a redundant copy synchronization token tracking system.

Disclosed are a data storage library, and a method which may be implemented in a programmable computer processor by a computer program product, for accessing identifiable data volumes from a plurality of data storage libraries in response to recall requests. The data storage libraries store redundant copies of the data volumes, and have cache storage and backing storage. The data volumes are each directly associated with an updatable synchronization token, the synchronization token indicating the relative update levels of the directly associated redundant copies. The data storage libraries are coupled to a plurality of directors, and the directors, in forwarding the recall requests, additionally request the directly associated synchronization tokens. A data storage library migrates the data volumes from the cache storage to the backing storage.

In accordance with the present invention, the data storage library maintains the synchronization token directly associated with the data volume; identifies each of the data volumes upon being stored in the cache storage of the data storage library; and identifies each of the data volumes migrated to the backing storage of the data storage library. Then, the data storage library responds to a recall request for one of the redundant copies of the identifiable data volumes, providing, with the synchronization token directly associated with the identifiable data volume, an indicator, from the identifying steps, which indicates whether the identifiable data volume is identified as currently stored in the cache storage or the backing storage. Thus, the performance of the accessing is increased by a selection of a redundant copy of the identifiable data volume identified as stored in the cache storage rather than a copy identified as stored in the backing storage.

For a fuller understanding of the present invention, reference should be made to the following detailed description taken in conjunction with the accompanying drawings.

BRIEF DESCRIPTION OF THE DRAWINGS

FIG. 3 is a generalized diagram of logical data volumes stored on a single physical volume for use in a data storage library of FIGS. 1 and 2;

FIGS. 4A and 4B are diagrammatic representations of tables relating data volumes to synchronization tokens directly associated with the data volumes, and for attaching indicators which indicate whether the data volume is stored in cache storage or backing storage in accordance with an embodiment of the present invention;

FIG. 5 is a representation of the codes for flag indicators which represent storage levels of data storage volumes in cache storage or backing storage in accordance with another embodiment of the invention;

FIGS. 6A and 6B are diagrammatic representations of tables relating data volumes to synchronization tokens directly associated with the data volumes, and for attaching-indicators, such-as those of FIG. 5, which indicate the storage level of the data volume in cache storage or backing storage in accordance with another embodiment of the present invention.

DETAILED DESCRIPTION OF THE INVENTION

This invention is described in preferred embodiments in the following description. with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
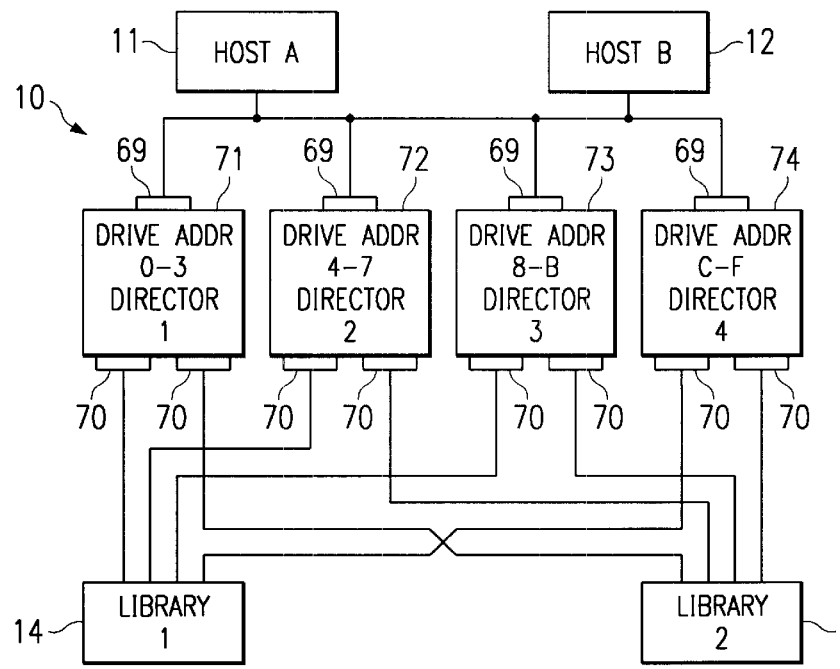
FIG. 1 is a block diagram showing interconnection of functional components of a data storage library subsystem employed in accordance with an embodiment of the present invention.

Referring to FIG. 1, an embodiment of a data storage library subsystem 10 is illustrated which redundantly couples host systems 11 and 12 to data storage libraries 14 and 15, via a plurality of directors 71–74, in accordance with the incorporated Day III et al. application. The Day III et al. application provides the directors for storing and tracking multiple copies of data in the data storage libraries. The tracking is accomplished by providing each redundant copy of the data volume with a directly associated synchronization token. Each director 71–74 communicates with a host over an interface 69 and with a library 14 or 15 over an interface 70.

The host systems 11 and 12 are coupled to and employ the data storage library subsystem 10 for storing data, typically stored as a data volume, which is not immediately required by the hosts, for example, if the data volume is infrequently accessed. However, when the data is required, the data volumes may be accessed numerous times and continually updated. Thus, referring additionally to FIG. 2, each data storage library comprises a "virtual" library which includes non-volatile cache storage 39 and 40, for maintaining the data volumes that have been recently accessed, and includes a backing storage, such as removable data storage media having data volumes 18, for storing data volumes for infrequent access.

Data volumes are provided to the library from a host and director, and the host waits until the virtual library writes the data volume to non-volatile cache before providing a "return" signal to the host.

The host systems 11 and 12 may be embodied by a variety of types and numbers of processing units, servers, or computing systems. The data storage libraries 14 and 15 may comprise any similar libraries for storing removable rewritable data storage media, such as magnetic tape cartridges or optical disks. A "library" may comprise a complete library or a partition of a larger library. An example of a suitable data storage library is the IBM 3494 Virtual Tape Server. More than two data storage libraries 14–15 may be provided, each storing one of the redundant copies of each of the redundant data volumes. For the purpose of having redundant data volumes, any libraries 14 or 15 may not comprise partitions of the same library.

Figure 2:
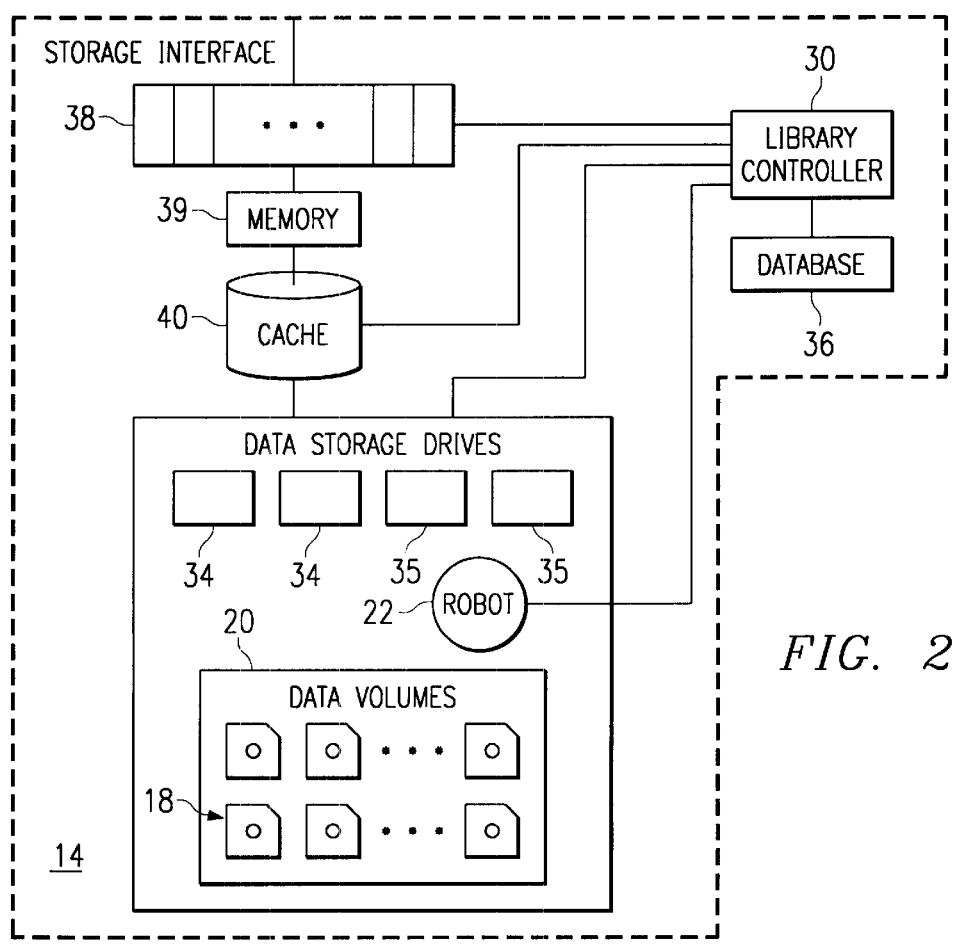
FIG. 2 is a block diagram showing functional components of an example of a data storage library of FIG. 1 employed in accordance with an embodiment of the present invention.

Referring to FIG. 2, the removable data storage media are stored in storage shelves 20 which are accessed by at least one robot 22 under the control of a library controller 30. The removable data storage media in storage shelves 20 containing the data volumes 18 comprise a backing storage. A plurality of data storage drives 34 and 35 allow access to read and/or write data volumes 18. The data storage library is a "virtual" library with non-volatile cache 39 and 40 coupled to the data storage drives 34 and 35. Cache storage 39 may comprise an electronic memory with non-volatile capability, such as a "flash" memory, or memory with a battery for back up power and is a "fast" cache, and cache storage 40 may comprise one or more magnetic disk drives. The library controller 30 may comprise a library manager which utilizes a data base 36 to track each data volume and the data storage media on which it is stored, to track the storage shelf location 20 of each data storage media, and to track each data volume in non-volatile fast cache 39 and non-volatile cache 40, in accordance with the present invention.

The data base 36 and non-volatile cache 40 may comprise the same or different magnetic disk drives.

Communication with the library is conducted at a storage interface 38 to the library controller 30, the non-volatile fast cache 39, and to the addressed drives 34 and 35. In accordance with the present invention, the addressed drives 34 and 35 may either accommodate different media and/or operate at different speeds. For example, data storage drives 34 may comprise optical disk drives for data volumes 18 stored on optical disk, and offer faster access to data volumes by means of random access seeks to any track, while data storage drives 35 may comprise tape drives for data volumes 18 stored on magnetic tape cartridges, which provide linear access to the data volumes. Alternatively, both data storage drives 34 and 35 may comprise tape drives, but data storage drives 34 may be higher cost and offer higher speed access to the data volumes, or data storage drives 34 may be associated with data storage media having less data capacity, but with faster access to data volumes. An example would be media that is shorter in length.

Referring to FIGS. 1 and 2, directors 71–74 are illustrated as separate from the libraries, however, one or more of the directors may be physically located in a library 14 or 15, and may comprise a separate board at, or may be a part of, a library controller 30. Additionally, a physical library may be partitioned, each partition treated as a separate library, with separately partitioned storage shelves 20, non-volatile cache 39 and 40, database 36 and data storage drives 34 and 35, while. sharing the robot or robots 22. The library controller 30 may comprise one or more processors and would track the data volumes separately and share control of the operation of the robot.

If a data volume is in the backing storage 20, and a command is received-to access the data volume, the library controller 30 identifies the data storage media and the storage shelf 20 containing the data volume. The library controller then operates the robot 22 to access the data storage media from the storage shelf 20 and to deliver the data storage media to a drive 34 or 35. When the data storage media containing the identified data volume 18 is delivered to the drive, and physically mounted on the drive and the data volume is accessed, the library controller 30 provides a "ready" signal at the storage interface 38. The data volume is then typically read into cache 40 or 39 and read and/or written by the addressing host via data transfer at the storage interface 38.

In accordance with the present invention, cache storage is defined either as a single cache storage 40 or as multiple levels of cache storage, including fast cache storage 39 and cache storage 40.

Once a data volume is in cache storage 39 or 40, it may be quickly accessed, or a received data volume may be quickly transferred to the library cache storage without waiting for the data storage media to be loaded. Since the cache storage is non-volatile, the data volume is retained in storage. The library controller 30 may cause the cache storage to appear to the director and host as though it is a number of drives with mounted media. The cache storage is thus a number of "virtual drives".

The cache storage 39 and 40 is limited in capacity as compared to the vast number of data volumes 18 that can be stored in the backing storage. Thus, data volumes in cache storage 39 and 40 must continually be migrated out of cache storage to the backing storage. Cache storage 39 additionally is limited in capacity to the cache storage 40. The migration may be from cache storage 39 to cache storage 40, as an initial migration, and subsequently from cache storage 40, to backing storage 20. Alternatively, the data volume may initially be stored in cache storage 39 or in cache storage 40 and directly migrated to backing storage 20. As a data volume is migrated, the portion of cache storage previously occupied by the migrated data volume is "freed", becoming available for storing another needed data volume.

The migration from cache storage to backing storage 20 may be directly to either drives 34 or to drives 35, or migration may continue in backing storage, with the data first migrated to backing storage at one of drives 34 and then migrated to another part of the backing storage at one of drives 35.

Typically, in removable data storage systems, a plurality of data volumes 18 are stored on a single physical data storage media, called a physical volume. FIG. 3 is a schematic representation of a physical volume 44, such as a magnetic tape in a cartridge, which contains N logical volumes, thereby replacing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes a header 60 which identifies the physical volume. Herein, a "data volume" may comprise one or more associated data volumes which are treated together by the library manager.

In accordance with the incorporated Day III et al. application, the library controller 30 provides a synchronization token directly associated with each data volume, the synchronization token comprising an updatable token. Referring to FIGS. 2 and 3, the synchronization tokens may be directly associated with data volumes 18 by storing the tokens in the data base 36, alternatively storing the tokens with each physical volume 44, or still alternatively storing the tokens directly with each data volume 51–58.

Referring to FIGS. 1 and 2, a plurality of directors 71–74 are provided, each separate from and coupled to the hosts 11–12 and each separate from and coupled to each data storage library 14–15. Each director responds to ones of separate, partitioned access addresses such as data storage drive addresses, addressed by the hosts with the supplied command. For example, director 71 responds to drive addresses 0–3, director 72 responds to drive addresses 4–7, director 73 responds to drive addresses 8–B, and director 74 responds to drive addresses C–F. The library controller 30 of each data storage library 14–15 provides an updatable synchronization token directly associated with each data volume. The responding director 71–74 supplies each data volume supplied from a host to all of the data storage libraries, and updates each synchronization token directly associated with the supplied data volume. Thus, the libraries 14–15 store duplicate copies of the data volume. The currency of the data volumes are each tracked by means of the directly associated synchronization token, and the synchronization token is not tracked by the host nor is a central tracking data base required. If a data volume is updated at a library, a director increments the synchronization token and supplies the updated synchronization token to the library to directly associate the synchronization token with the data volume to track the update level of the data volume. As each of the redundant copies is updated, the directly associated synchronization token is also updated, so that the currency of each of the redundant copies of the data volume is tracked by the synchronization tokens.

The library controller 30 comprises at least one programmable computer processor, such as an IBM RS-6000 processor, and is provided with an operating system and application programs for operating in accordance with the present invention. The application programs may comprise a computer program product, comprising computer readable program code. The computer program product may be supplied electronically, as from a network or one of the hosts 11–12 at communications interface 38, via a director. Alternatively, the computer program product may be supplied at an I/O station of the processor or from a, storage media which stores executable computer instructions, and comprises an article of manufacture, such as data storage media 44 in FIG. 3. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital presentations of computer executable instructions. The operating system and application programs may be stored in the data base 36.

The data storage libraries may have different arrangements of the shelves and different numbers of drives, and may migrate different ones of the redundant copies of the data volumes at different rates, for example, as described in copending, coassigned Bish et al. application Ser. No. (TU999040), filed on even date herewith. Thus, the content of the cache storage 39–40 for each of the libraries 14–15 may be different at any one time.

The present invention increases the performance for accessing data volumes stored in the plurality of data-storage libraries 14–15 which store redundant copies of the data volumes.

In accordance with the present invention, each of the data storage libraries 14–15 maintains the synchronization token directly associated with the data volume. The library controller 30 of each data storage library attaches a cache flag to the synchronization token for each of the data volumes upon being stored in the cache storage 39 and/or 40 of the data storage library, identifying the cache storage of the data volume, and changes the cache flag of each of the data volumes as it is migrated to the backing storage 20 of the data storage library, identifying the data volume as having been migrated to the backing storage.

The directors 71–74 receive recall requests from the hosts 11–12 for data volumes stored in the data storage libraries. As discussed above, the directors forward the commands to the libraries. A director, in forwarding a recall request, requests the directly associated synchronization token from each library. Then, each data storage library responds to a recall request for one of the redundant copies of the identifiable data volumes, providing, with the synchronization token directly associated with the identifiable data volume, an indicator, from the identifying steps, which indicates whether the identifiable data volume is identified as currently stored in the cache storage 39–40 or the backing storage 20. Thus, the performance of the accessing is increased by a selection of a redundant copy of the identifiable data volume identified as stored in the cache storage rather than a copy identified as stored in the backing storage.

Referring additionally to FIGS. 4A and 4B, one embodiment of an indicator is a "flag" 67, which is one or more bits in a specific location in a table. Tables 61 and 62 are illustrated for each of two libraries, library "1" and library "2", such as libraries 14 and 15. Each table is preferably in the data base 36 of the library. Each table relates the data volume (e.g., VOLSER) 65 to the directly associated synchronization token 66, thereby maintaining and storing the synchronization token. In accordance with the present invention, the flag 67, also called a "cache" flag, is attached to the synchronization token for the directly associated data volume. Thus, the cache flag indicates whether the data volume is currently stored in cache storage 39–40, a "1", or in backing storage 20, a "0". Herein, a "cache" flag may indicate that a data volume is in cache storage or backing storage, also called a "backing storage" flag.

Using the examples of tables 61 and 62, the synchronization tokens 66 are different for data volume "0001", thus, in accordance with the incorporated Day III et al. application, the library having the data volume with the most current synchronization token, library "1", will be selected for providing the data volume, and the attached cache flags 67 will not be considered. The reverse is true for data volume "0002", with library "2" having the most current synchronization token.

With respect to data volume "0003", the synchronization tokens are identical. This will be the normal case when the libraries are functioning normally. Thus, in accordance with the present invention, the requesting director 71–74 will select the data volume which is in cache storage as indicated by the cache flag "1" 67 for library "1" rather than the data volume which is in backing storage as indicated by the cache flag "0" 67 for library "2".

FIG. 5 illustrates an alternative embodiment of the indicators, comprising a binary code 90 for cache flags. As illustrated, fast cache 39 is indicated by the code "11", the other cache 40 is indicated by the code "10", backing storage (1) 20 accessible by drives 34 is indicated by the code "01", and backing storage (2) 20 accessible by drives 35 is indicated by the code "00".

As an alternative, backing storage (1), code "01", may represent data volumes presently at a drive 34–35, and backing storage (2), "00", may represent data volumes in the storage shelves 20. Still alternatively, backing storage (1) may additionally comprise data volumes being transported by a robot 22.

FIGS. 6A and 6B illustrate alternative cache flags 68 employing the codes 90 of the table of FIG. 5. The cache flags 68 are bits in a specific location in a table in, each library. Tables 61 and 62 are again illustrated for libraries "1" and "2", such as libraries 14 and 15. Again, each table is preferably in the data base 36 of the library. Each table relates the data volume (e.g., VOLSER) 65 to the directly associated synchronization token 66, thereby maintaining and storing the synchronization token. In accordance with the present invention, the cache flag 68 is attached to the synchronization token for the directly associated data volume. Thus, the cache flag indicates whether the data volume is currently stored in fast cache storage 39, a "11", other cache 40, a "10", or in backing storage 20, a "01" for backing storage (1) and "00" for backing storage (2).

Using the examples of tables 61 and 62, the synchronization tokens 66 are identical for the illustrated data volumes, which is the typical situation when the libraries are operating normally. Thus, in accordance with the present invention, the libraries supply the cache flag indicators attached to the synchronization tokens for the data volume. Then, the library having the data volume with the highest level flag, indicating that the data volume is in storage which provides faster access to the data, will be selected.

For example, the cache flag for data volume "0001" in library "1" is "11" indicating that the data volume is in fast cache 39, while the flag is "10" in library "2" indicating that the data volume is in the other cache 40. Thus, the director will select library "1". The cache flag for data volume "0002" is "10" in library "1" and "01" in library "2", meaning that the data volume is in cache storage 40 in library "1" and in backing storage in library "2". Hence, the data volume will be selected from the library having the data volume in cache storage, library "1". With respect to data volume "0003", the synchronization tokens are identical, and the cache flags indicate that both libraries are storing the data volume in backing storage. In accordance with the present invention, the requesting director 71–74 will select the data volume which is in backing storage (1), flag "01" for library "1", rather than the data volume which is in backing storage (2) as indicated by the cache flag "00" 68 for library "2".

Figure 7:
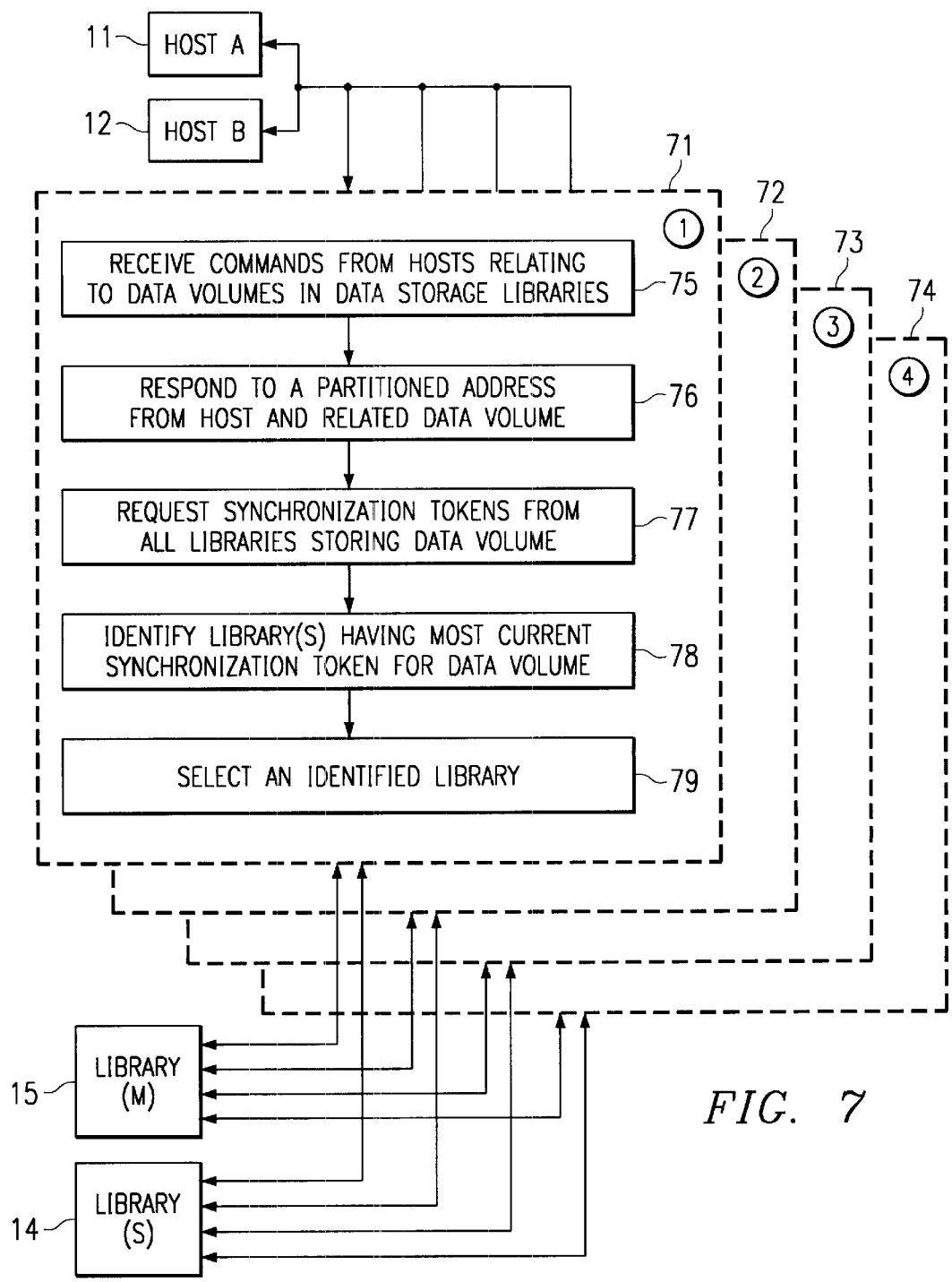
FIG. 7 is a flow chart depicting a generalized embodiment of a method of the data storage library subsystem of FIG. 1 employed in accordance with an embodiment of the present invention.

FIG. 7 is based upon the incorporated Day III et al. application, and as discussed therein, referring additionally to FIG. 1, the hosts 11–12 address the directors by access addresses, which may comprise data storage drive addresses, supply the data volumes to be stored, and receive the accessed data volumes. The directors, in step 75, receive commands from the hosts 11–12 relating to identifiable data volumes, and are separate from, the hosts and separate from each of the data storage libraries 14–15. In step 76, the directors respond to ones of separately partitioned separated access addresses addressed by the hosts and to any accompanying data volumes. In step 77, the director which responds to a partitioned access address and to a data volume recall request, first requests synchronization tokens from all of the data storage libraries storing the data volume. Then, in step 78, the director examines the synchronization tokens received from the libraries, and identifies the library(s) having the most current synchronization token for the data volume. Lastly, in step 79, the director selects an identified library. Should more than one library have the most current synchronization token directly associated with the data volume, the director selects one of the libraries based, for example, upon a rotating basis.

In accordance with the present invention, the selection of step 79 is instead based on the indicators attached to the synchronization tokens.

Figure 8:
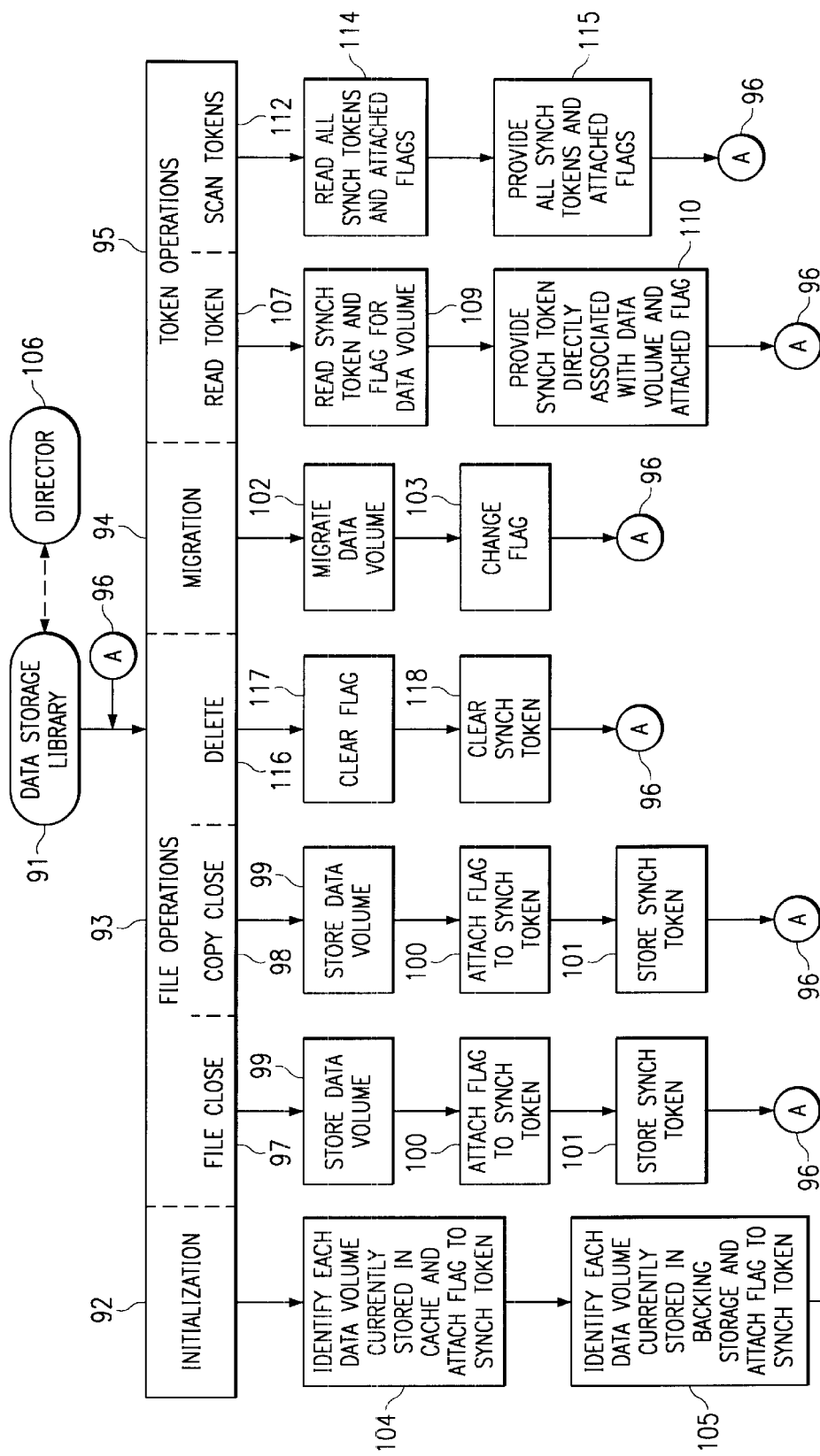
FIG. 8 is an operational diagram depicting a generalized method in accordance with an embodiment of the present invention employed with the data storage library of FIG. 2.

FIG. 8 illustrates a generalized embodiment in accordance with the present invention. A data storage library 91 performs various operations involving the cache flags. These operations may include initialization 92 to determine the current content of the library, file operations 93 to store or delete data volumes, migration 94 of data volumes within the library, and token operations 95. Upon completion of any one operation, connector 96 indicates that the library is ready for the next operation. Many library operations are not shown, such as accessing or reading a data volume, as will be discussed.

File operations 93 may include the closing of a file 97, predominately by a host, and copying a file 98, predominately from another library in accordance with commands from a director. In either case, the library stores the data volume in step 99. The data volume is stored in cache storage to save processing time, even if it will not be reassessed shortly.

In step 100, upon the data volume being stored in cache storage, the data storage library controller attaches a cache flag indicator, such as "1" in FIGS. 4A or 4B, to the synchronization token for the data volume, identifying the data volume as stored in cache storage. In step 101, the library stores the synchronization token 66 directly associated with the data volume 65 in the table 61 or 62 of FIGS. 4A, 4B, 6A or 6B.

The migration operation 94 is internal to the library. Other forms of migration include migration of data volumes from a host system to a library and migration of data volumes out of the library. Those operations appear as file operations 93 to the library.

As discussed above, the library, in step 102, migrates a data volume to a different storage, for example, from cache storage 39–40 to backing storage 20. The library controller 30 then changes the cache flag to indicate the migration, for example, changing the cache flag to "0" in FIGS. 4A or 4B, indicating backing storage.

An initialization operation 92 may be conducted if the flags (or some of the flags) are unknown or have not been provided. In step 104, the library identifies each data volume currently stored in cache storage 39–40, and attaches the cache flag indicator, such as "1" in FIGS. 4A or 4B, to the synchronization token. In step 105, the library identifies each data volume that has been migrated to and is currently stored in backing storage 20, and attaches the cache flag to the synchronization token from indicating cache storage to a flag, such as "0" in FIGS. 4A or 4B, indicating backing storage.

Upon a director receiving a request for a data volume at step 106, the director requests a synchronization token, and the library conducts a read token operation for the data volume at step 107. In accordance with the present invention, the library, in step 109, reads the synchronization token and cache flag for the data volume from the appropriate table, and provides the synchronization token directly associated with the data volume in step 110 with the cache flag of steps 100, 103, 104 or 105, depending on the location of the data volume in the library at the time of the request.

A host, director or library may request a token scan operation 112. In step 114, the library controller reads the contents of table 4A or 4B, or 6A or 6B, and, in step 115, provides all the read synchronization tokens and attached flags for the requester.

When a data volume is removed from the library 116, the cache flag is cleared, for example, by setting it to a null, and the synchronization token is also set to a null in step 118. The space in the table is thus made available for the synchronization token and attached flag for another data volume.

Figure 9:
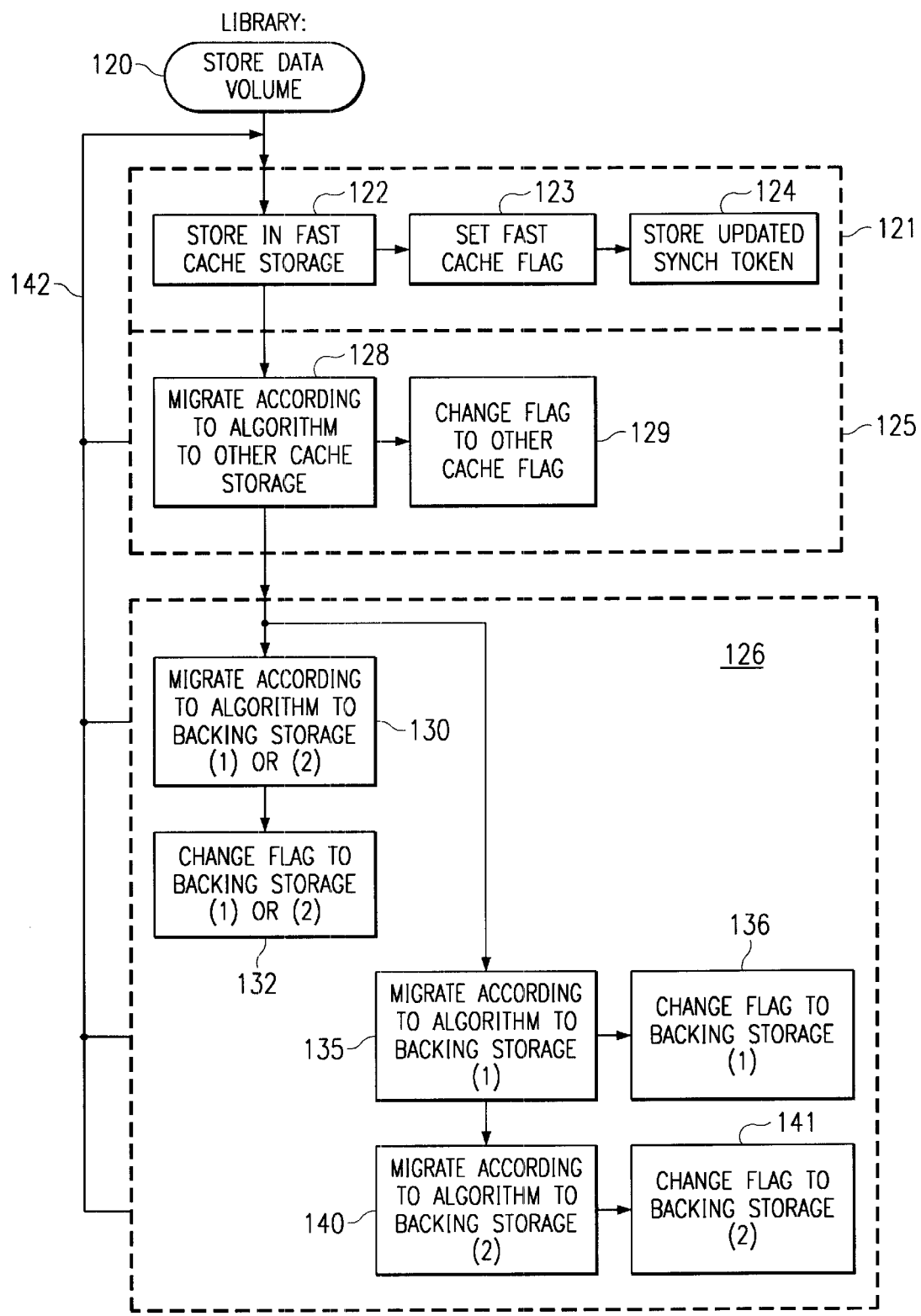
FIG. 9 is a flow chart depicting alternative methods of storing and migrating data volumes and attaching the flag indicators to the synchronization tokens in accordance with alternative embodiments of the present invention.

FIG. 9 illustrates alternative methods of steps 100 and 103 of FIG. 8 for storing and migrating data volumes and attaching the flag indicators to the synchronization tokens in accordance with alternative embodiments of the present invention. The storage process begins at step 120 with the receipt of the data volume, for example from a director 71–74.

Referring additionally to FIGS. 1, 2, 6A and 6B, the library controller 30, in step 121, stores the data volume in cache storage at step 122 in fast cache storage 39, and sets the indicator 68 to a fast cache flag, such as flag "11", attached to the synchronization token in step 123. Then, in step 124, the library controller stores the updated synchronization token 66 directly associated with the data volume, and the attached flag, in table 61 or 62 of data base 36. The steps 122–124 may occur simultaneously or in any sequence in accordance with the present invention.

Subsequently, if the data volume is not recalled or accessed, an algorithm of the library controller 30 dictates the migration of the data volume in step 125 to other cache, or in step 126 to backing storage. Thus, in step 128, the library controller may migrate the data volume from fast cache 39 to the other cache 40, and, in step 129, changes the flag 68 in table 61 or 62 to the other cache flag, e.g., "10". The migration algorithm employed is a matter of choice as understood by those of skill in the art, such as a least recently used (LRU) algorithm.

As discussed above, subsequently, if the data volume is not recalled, the library controller migrates the data volume from cache storage 39–40 to backing storage 20 in step 126. In one embodiment, step 130 migrates the data volume according to an algorithm to either backing storage (1) or backing storage (2). Examples of such algorithms are understood by those of skill in the art, and may directly assign the data volume to the backing storage in which other data volumes having a common affinity are stored, or assign the data volume to the backing storage most closely associated with the likely future recall of the data volume.

In step 132, in accordance with the present invention, the cache flag 68 in table 61 or 62 is changed from a cache storage flag, such as the other cache flag, "10" to the backing storage cache flag, e.g., a "01" for backing storage (1) or a "00" for backing storage (2) by library controller 30.

In an alternative embodiment, the data volume is first migrated, in step 135, according to an algorithm to backing storage (1). Again, the algorithm may be understood by those of skill in the art. Upon conducting the migration, the library controller 30, in step 136, changes the flag from a cache storage flag to the flag indicating backing storage (1), e.g., "01", in table 61 or 62. At a subsequent time, again if the data volume is not recalled or accessed, the library controller 30 further migrates the data volume according to an algorithm, in step 140, from backing storage (1) to backing storage (2), and, in step 141, changes the flag 68 in table 61 or 62 from indicating backing storage (1) to indicating backing storage (2), e.g., "00". Other implementations of the method in accordance with the invention may be envisioned by those of skill in the art.

If the data volume is accessed, it may be moved back to fast cache in step 142. Accessing and/or reading a data volume will not necessarily result in a movement of the data volume to fast cache.

Figure 10:
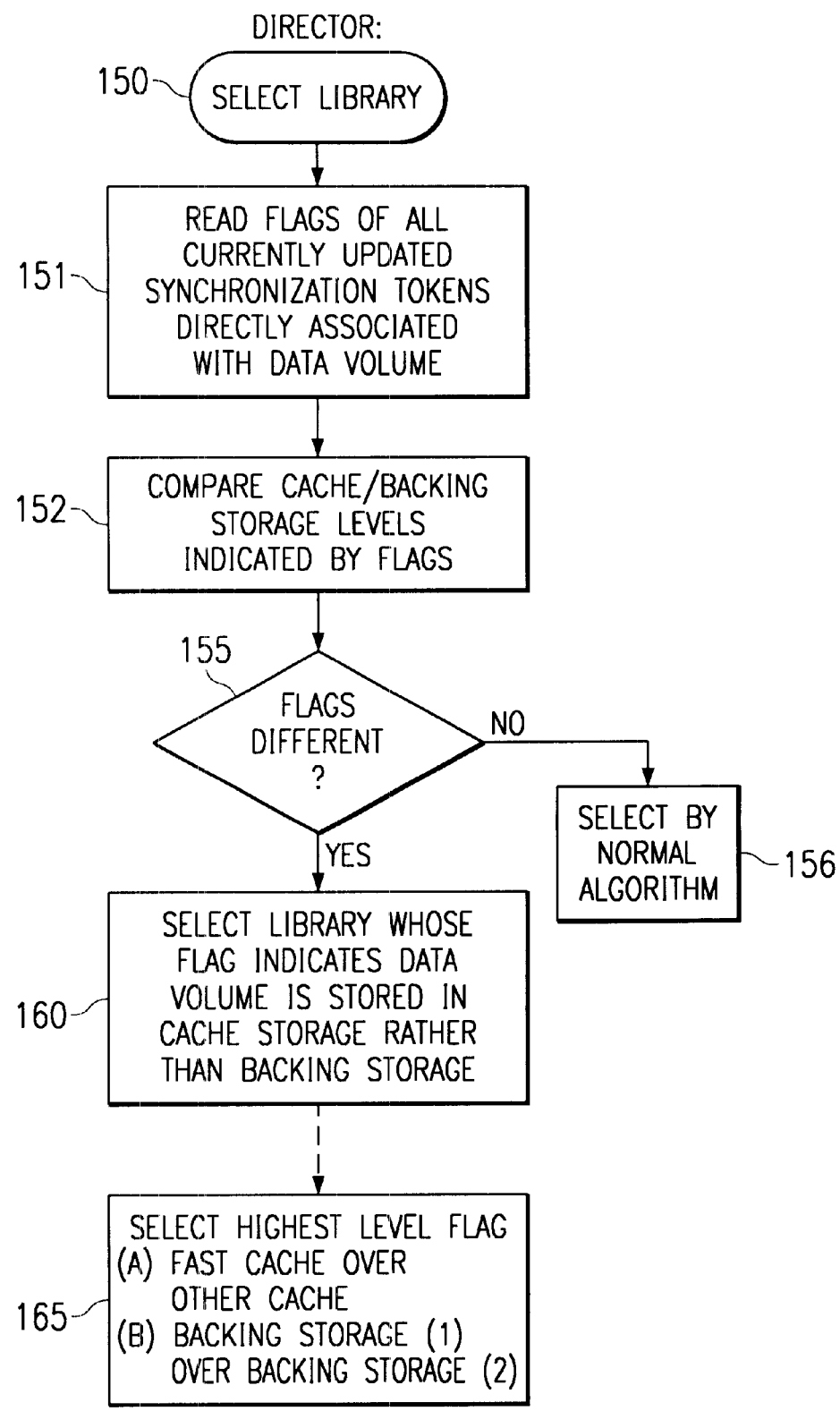
FIG. 10 is a flow chart depicting alternative methods of selecting a data storage library for providing a data volume based upon the flag indicators attached to the synchronization tokens directly associated with the data volumes in accordance with alternative embodiments of the present invention.

FIG. 10 illustrates alternative embodiments of the present invention for selecting the data storage library from which the data volume is to be accessed, beginning at step 150. In step 151, a director 71–74 reads the flags, or indicators, attached to each of the currently updated synchronization tokens directly associated with the requested data volume from the libraries 14–15 that are accessible to the director.

In step 152, the flags from the various data storage libraries 14–15 are compared. As discussed above, the data volumes may be stored at the same level in all libraries, but are likely to be in different stages of migration, and therefore stored at different levels of cache storage and/or backing storage.

In step 155, the director 71–74 determines if the flags are different. If not, "NO", the flags are identical and the speed of access will therefore be similar at any of the libraries. Hence, step 156 comprises employing a normal algorithm to select the library for accessing the data volume, such as a rotating round robin basis.

If the flags are different, the data volume may be accessed at different speeds according to the present invention. In one alternative, in step 160, the director 71–74 selects the library whose flag 67 in table 61 or 62 of FIGS. 4A or 4B indicates that the data volume is stored in cache storage 39–40 rather than in backing storage 20. In the tables 61 or 62, the cache storage indicator is a flag of "1".

In the alternative embodiment of step 165, the director 71–74 selects the library whose flag 68 in table 61 or 62 of FIGS. 6A or 6B indicates that the data volume is stored in cache storage rather than in backing storage, but additionally selects either the highest level of cache storage 39–40 or the highest level of backing storage 20. Thus, step 165 is the selection of (A) a library 14–15 whose flag indicates that the data volume is stored in fast cache 39 rather than other cache 40, or (B) a library whose flag indicates that the data volume is stored in backing storage (1) rather than backing storage (2). Again, those of skill in the art may envision other implementations of the method of the present invention.

Thus, in accordance with the present invention, the performance of the directors 71–74 is increased for accessing data volumes from data storage libraries in a redundant copy synchronization token tracking system.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for accessing identifiable data volumes from a plurality of data storage libraries in response to recall requests, said data storage libraries storing redundant copies of said identifiable data volumes, said data storage libraries having cache storage and backing storage, said identifiable data volumes each directly associated with an updatable synchronization token, said synchronization token indicating the relative update levels of said directly associated redundant copies, said data storage libraries coupled to a plurality of directors, each said data storage library migrating data volumes from said cache storage to said backing storage, said recall requests forwarded from said directors additionally requesting said directly associated synchronization tokens, said method comprising the steps of:

said data storage library maintaining said synchronization token directly associated with said data volume;

said data storage library identifying each of said data volumes upon being stored in said cache storage of said data storage library;

said data storage library identifying each of said data volumes migrated to and stored in said backing storage of said data storage library; and said data storage library responding to said recall request for one of said redundant copies of said identifiable data volumes, providing, with said synchronization token directly associated with said identifiable data volume, an indicator, responsive to said identifying steps, which indicates whether said identifiable data volume is identified as currently stored in said cache'storage or said backing storage, whereby the performance of said accessing is increased by a selection of a redundant copy of said identifiable data volume identified as stored in said cache storage rather than a copy identified as stored in said backing storage.

2. The method of claim 1, wherein said indicator providing step comprises attaching a "cache" flag, indicating said cache storage, to said synchronization token upon said identifiable data volume being identified as stored in said cache storage.

3. The method of claim 2, additionally comprising the step of accessing any of said redundant copies from a data storage library providing said "cache" flag, indicating said cache storage, attached to a currently updated said synchronization token for said identifiable data volume.

4. The method of claim 3, wherein said accessing step additionally comprises, upon more than one of said data storage libraries providing said "cache" flag, indicating said cache storage, attached to a currently updated said synchronization token for said identifiable data volume, accessing said data volume from one of said libraries on a rotating round robin basis.

5. The method of claim 2, wherein said cache storage comprises two levels of non-volatile cache storage, one of said levels substantially faster than the other; wherein said "cache" flag comprises at least 3 flags, a first "cache" flag indicating said fast level of cache storage, a second "cache" flag indicating said other level of cache storage, and a "backing storage" flag indicating said backing storage; wherein said cache storage identifying step additionally comprises identifying said fast or said other level of said cache storage; and wherein said indicator providing step comprises attaching said first "cache" flag to said synchronization token upon said identifiable data volume being identified as stored in said fast level of cache storage, attaching said second "cache" flag to said synchronization token upon said identifiable data volume being identified as stored in said other level of cache storage, and attaching said "backing storage" flag to said synchronization token upon said identifiable data volume being identified as stored in said backing storage; whereby the performance of said accessing is increased by a selection of a redundant copy of said identifiable data volume identified by said first "cache" flag as stored in said fast level of cache storage rather than a copy identified by said second "cache" flag as stored in said other level of cache storage, and, if no copy is in said fast level of cache storage, by a selection of a redundant copy of said identifiable data volume identified by said second "cache" flag as stored in said other level of cache storage rather than a copy identified by said "backing storage" flag as stored in said backing storage.

6. The method of claim 2, wherein said backing storage comprises two levels of backing storage of removable data storage media; wherein said "cache" flag comprises at least 3 flags, a "cache" flag indicating said cache storage, a first "backing storage" flag indicating one level of said backing storage, and a second "backing storage" flag indicating another level of said backing storage; wherein said backing storage identifying step additionally comprises identifying said one level or said another level of said backing storage; and wherein said indicator providing step comprises attaching said "cache" flag to said synchronization token upon said identifiable data volume being identified as stored in said cache storage, attaching said first "backing storage" flag to said synchronization token upon said identifiable data volume being identified as stored in said one level of backing storage, and attaching said second "backing storage" flag to said synchronization token upon said identifiable data volume being identified as stored in said another level of backing storage; whereby the performance of said accessing is increased by a selection of a redundant copy of said, identifiable data volume identified by said "cache" flag as stored in said cache storage rather than a copy identified by said first or said second "backing storage" flag as stored in said backing storage, and, if no copy is in said cache storage, by a selection of a redundant copy of said identifiable data volume identified by said first "backing storage" flag as stored in said one level of backing storage rather than a copy identified by said second "backing storage" flag as stored in said other level of backing storage.

7. A data storage library for accessing stored identifiable data volumes in response to recall requests, said library one of a plurality of data storage libraries storing redundant copies of identifiable data volumes, said data storage library coupled to a plurality of directors, said directors coupled to at least one other of said data storage libraries, said identifiable data volumes each directly associated with an updatable synchronization token, said synchronization token indicating the relative update levels of said directly associated redundant copies, said recall requests additionally requesting said directly associated synchronization tokens, said data storage library comprising:

a cache storage;

a backing storage; and a library controller, said library controller maintaining said synchronization token directly associated with said data volume; said library controller storing data volumes in said cache storage and migrating data volumes from said cache storage to said backing storage; said library controller identifying each of said data volumes upon being stored in said cache storage; said library controller identifying each of said data volumes migrated to and stored in said backing storage; and said library controller responding to said recall request for one of said redundant copies of said identifiable data volumes, providing, with said synchronization token directly associated with said identifiable data volume, an indicator which indicates whether said identifiable data volume is identified as currently stored in said cache storage or said backing storage, whereby the performance of said accessing is increased by a selection of a redundant copy of said identifiable data volume identified as stored in said cache storage rather than a copy identified as stored in said backing storage.

8. The data storage library of claim 7, wherein said library controller attaches a "cache" flag, indicating said cache storage, to said synchronization token upon said identifiable data volume being identified as stored in said cache storage.

9. The data storage library of claim 8, wherein said cache storage comprises two levels of non-volatile cache storage, one of said levels substantially faster than the other; wherein said library controller said "cache" flag comprises at least 3 flags, a first "cache" flag indicating said fast level of cache storage, a second "cache" flag indicating said other level of cache storage, and a "backing storage" flag indicating said backing storage; wherein said library controller additionally identifies said fast or said other level of said cache storage; and wherein said library controller attaches said first "cache" flag to said synchronization token upon said identifiable data volume being identified as stored in said fast level of cache storage, attaches said 'second "cache" flag to said synchronization token upon said identifiable data volume being identified as stored in said other level of cache storage, and attaches said "backing storage" flag to said synchronization token upon said identifiable data volume being identified as stored in said backing storage; whereby the performance of said accessing is increased by a selection of a redundant copy of said identifiable data volume identified by said first "cache" flag as stored in said fast level of cache storage rather than a copy identified by said second "cache" flag as stored in said other level of cache storage, and, if no copy is in said fast level of cache storage, by a selection of a redundant copy of said identifiable data volume identified by said second "cache" flag as stored in said other level of cache storage rather than a copy identified by said "backing storage" flag as stored in said backing storage.

10. The data storage library of claim 8, wherein said backing storage comprises two levels of backing storage of removable data storage media; wherein said library controller "cache" flag comprises at least 3 flags, a "cache" flag indicating said cache storage, a first "backing storage" flag indicating one level of said backing storage, and a second "backing storage" flag indicating another level of said backing storage; wherein said library controller identifies said one level or said another level of said backing storage; and wherein said library controller attaches said "cache" flag to said synchronization token upon said identifiable data volume being identified as stored in said cache storage, attaches said first "backing storage" flag to said synchronization token upon said identifiable data volume being identified as stored in said one level of backing storage, and attaches said second "backing storage" flag to said synchronization token upon said identifiable data volume being identified as stored in said another level of backing storage; whereby the performance of said accessing is Increased by a selection of a redundant copy of said identifiable data volume identified by said "cache" flag as stored in said cache storage rather than a copy identified by said first or said second "backing storage" flag as stored in said backing storage, and, if no copy is in said cache storage, by a selection of a redundant copy of said identifiable data volume identified by said first "backing storage" flag as stored in said one level of backing storage rather than a copy identified by said second "backing storage" flag as stored in said other level of backing storage.

11. A data storage library subsystem for accessing stored identifiable data volumes in response to recall requests, said data storage library subsystem comprising:
- a plurality of data storage libraries storing redundant copies of said identifiable data volumes, said identifiable data volumes each directly associated with an updatable synchronization token, said synchronization token indicating the relative update levels of said directly associated redundant copies, each of said data storage libraries comprising:
  - a cache storage;
  - a backing storage; and
  - a library controller, said library controller maintaining said synchronization token directly associated with said data volume; said library controller storing data volumes in said cache storage and migrating data volumes from said cache storage to said backing storage; said library controller identifying each of said data volumes upon being stored in said cache storage; said library controller identifying each of said data volumes migrated to and stored in said backing storage; and said library controller responding to said recall request for one of said redundant copies of said identifiable data volumes, providing, with said synchronization token directly associated with said identifiable data volume, an indicator which indicates whether said identifiable data volume is identified as currently stored in said cache storage or said backing storage; and
- a plurality of directors, each of said directors coupled to each of said data storage libraries, at least one of said directors forwarding said recall request to said data storage libraries, said director receiving said provided synchronization token directly associated with said identifiable data volume and said indicator from each of said data storage libraries, said director accessing any of said redundant copies from a data storage library providing said indicator indicating that said data volume Is currently stored in said cache storage and said synchronization token comprising a currently updated said synchronization token for said identifiable data volume.

12. The data storage library subsystem of claim 11, wherein said data storage library controller attaches a "cache" flag, indicating said cache storage, to said synchronization token upon said identifiable data volume being identified as stored in said cache storage.

13. The data storage library subsystem of claim 12, wherein said director additionally, upon more than one of said data storage libraries providing said "cache" flag, indicating said cache storage, attached to a currently updated said synchronization token for said identifiable data volume, accessing said data volume from one of said libraries on a rotating round robin basis.

14. A computer program product usable with a programmable computer processor having computer readable program code embodied therein, said programmable computer processor at one of a plurality of data storage libraries, for accessing stored identifiable data volumes in response to recall requests, said plurality of data storage libraries storing redundant copies of identifiable data volumes, said data storage library coupled to a plurality of directors, said directors coupled to at least one other of said data storage libraries, said identifiable data volumes each directly associated with an updatable synchronization token, said synchronization token indicating the relative update levels of said directly associated redundant copies, said recall requests forwarded from said directors additionally requesting said directly associated synchronization tokens, each said data storage library having a cache storage and a backing storage and migrating data volumes from said cache storage to said backing storage, said computer program product comprising:
- computer readable program code which causes said programmable computer processor to maintain said synchronization token directly associated with said data volume;
- computer readable program code which causes said programmable computer processor to identify each of said data volumes upon being stored in said cache storage of said data storage library;

computer readable program code which causes said programmable computer processor to identify each of said data volumes migrated to and stored in said backing storage of said data storage library; and computer readable program code which causes said programmable computer processor to respond to said recall request for one of sa d redundant copies of said identifiable data volumes, to provide, with said synchronization token directly associated with said identifiable data volume, an indicator, responsive to said storage identification, whether said identifiable data volume is identified as currently stored in said cache storage or said backing storage, whereby the performance of said accessing is increased by a selection of a redundant copy of said identifiable data volume identified as stored in said cache storage rather than a copy identified as stored in said backing storage.

15. The computer program product of claim 14, wherein said computer readable program code which causes said programmable computer processor to provide said indicator, to attach a "cache" flag, indicating said cache storage, to said synchronization token upon said identifiable data volume being identified as stored in said cache storage.

16. The computer program product of claim 15, wherein said data storage library said cache storage comprises two levels of non-volatile cache storage, one of said levels substantially faster than the other; wherein said computer readable program code said "cache" flag comprises at least 3 flags, a first "cache" flag indicating-said fast level of cache storage, a second "cache" flag indicating said other level of cache storage, and a "backing storage" flag indicating said backing storage; wherein said computer readable program code which causes said programmable computer processor to identify each of said data volumes stored in said cache storage additionally comprises identifying said fast or said other level of said cache storage; and wherein said computer readable program code which causes said programmable computer processor to provide said indicator, causes said programmable computer processor to attach said first "cache" flag to said synchronization token upon said identifiable data volume being identified as stored in said fast level of cache storage, to attach said second "cache" flag to said synchronization token upon said identifiable data volume being identified as stored in said other level of cache storage, and to attach said "backing storage" flag to said synchronization token upon said identifiable data volume being identified as stored in said backing storage; whereby the performance of said accessing is increased by a selection of a redundant copy of said identifiable data volume identified by said first "cache" flag as stored in said fast level of cache storage rather than a copy identified by said second "cache" flag as stored in said other level of cache storage, and, if no copy is in said fast level of cache storage, by a selection of a redundant copy of said identifiable data volume identified by said second "cache" flag as stored in said other level of cache storage rather than a copy identified by said "backing storage" flag as stored in said backing storage.

17. The computer program product of claim 15, wherein said data storage library said backing storage comprises two levels of backing storage of removable data storage media; wherein said computer readable program code said "cache" flag comprises at least 3 flags, a "cache" flag indicating said cache storage, a first "backing storage" flag indicating one level of said backing storage, and a second "backing storage" flag indicating another level of said backing storage; wherein said computer readable program code which causes said programmable computer processor to identify each of said data volumes currently stored in said backing storage additionally comprises identifying said one level or said another level of said backing storage; and wherein said computer readable program code which causes said programmable computer processor to provide said indicator, causes said programmable computer processor to attach said "cache" flag to said synchronization token upon said identifiable data volume being identified as stored in said cache storage, to attach said first "backing storage" flag to said synchronization token upon said identifiable data volume being identified as stored in said one level of backing storage, and to attach said second "backing storage" flag to said synchronization token upon said identifiable data volume being identified as stored in said another level of backing storage; whereby the performance of said accessing is increased by a selection of a redundant copy of,said identifiable data volume identified by said "cache" flag as stored in said cache storage rather than a copy identified by said first or said second "backing storage" flag as stored in said backing storage, and, if no copy is in said cache storage, by a selection of a redundant copy of said identifiable data volume identified by said first "backing storage" flag as stored in said one level of backing storage rather than a copy identified by said second "backing storage" flag as stored in said other level of backing storage.

18. The computer program product of claim 15, wherein said computer readable program code additionally causes a second programmable computer processor at said director to access any of said redundant copies from a data storage library providing said "cache" flag, indicating said cache storage, attached to a currently updated said synchronization token for said identifiable data volume.

19. The computer program product of claim 18, wherein said computer readable program code which causes said second programmable computer processor to access said redundant copies additionally, upon more than one of said data storage libraries providing said "cache" flag, indicating said cache storage, attached to a currently updated said synchronization token for said identifiable data volume, to access said data volume from one of said libraries on a rotating round robin basis.

* * * * *